UNITED STATES PATENT OFFICE.

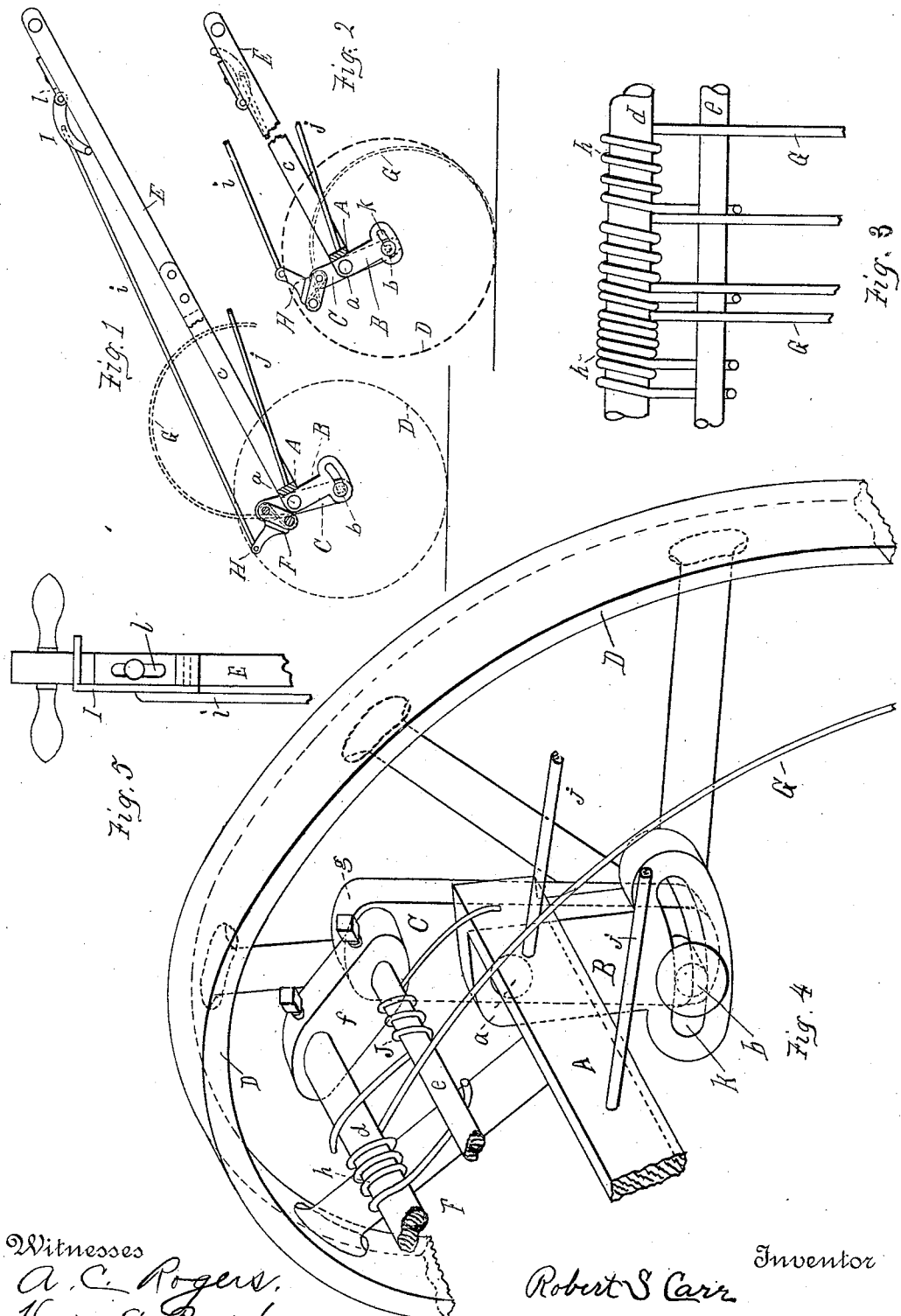

ROBERT S. CARR, OF HAMILTON, OHIO.

LAWN-RAKE.

SPECIFICATION forming part of Letters Patent No. 443,567, dated December 30, 1890.

Application filed March 28, 1890. Serial No. 345,649. (No model.)

*To all whom it may concern:*

Be it known that I, ROBERT S. CARR, of Hamilton, Butler county, Ohio, have invented a certain new and useful Lawn-Rake, of which the following is a specification.

My invention relates to improvements in wheeled lawn-rakes operated by hand from the rear.

The objects of my improvements are, first, to provide rake-teeth of such form that they are self-attaching to the rake-head, and may be adjusted laterally thereon; second, to have the teeth coiled to the extent of the spaces between them to provide maximum vertical flexibility; third, the application of a spring to lift the teeth; fourth, means of adjusting the rake-head vertically, and, fifth, means of adjusting the teeth to different vertical angles. I attain these objects by the mechanism illustrated in the accompanying drawings, in which—

Figure 1 is a transverse vertical section showing the rake with the teeth raised. Fig. 2 is same view as Fig. 1, except the teeth are shown in working position. Fig. 3 is a plan of the rake-teeth in the plane of the rake-head, showing manner of their attachment and lateral adjustment. Fig. 4 is a perspective view of Fig. 2 on an enlarged scale. Fig. 5 is a plan of the lock-lever, on an enlarged scale, showing manner of its adjustment.

Similar letters refer to similar parts throughout the several views.

Cross-bar A, with integral arms B, to which standards C are attached by bolts $a$ and $b$, constitute the rake-frame. Wheels D turn on hollow spindles (not shown) attached to standards C. Handle E is rigidly connected to cross-bar A by braces $c$. Rake-head F is composed of parallel rods $d$ and $e$, having their corresponding ends connected by armatures $f$. Rod $e$ extends beyond armatures $f$ into bearings $g$ in standards C, and forms the axis on which rake-head F may turn to raise the teeth, as shown in Fig. 1. Semicircular teeth G rest on rod $e$, describe open coils $h$ around rod $d$, and terminate under and against rod $e$. Coils $h$ have spaces equal to the thickness of teeth G. When in contact on rod $d$, they keep the teeth the farthest distance apart. In placing them on rod $d$ they may be screwed the one into the other one or more turns to adjust the teeth nearer together, as shown in Fig. 3. The extent of said coils increases the vertical flexibility of teeth G to spring over obstructions. Arm H is attached to rake-head F near its center. Its extremity is connected by wire $i$ to lock-lever I, which is adjustably pivoted to handle E, by which means the teeth G may be brought down to their working position when the lock-lever is turned back, and there retained by reason of wire $i$ passing below the pivot of said lock-lever. Coil-spring J is placed on and near one end of rod $e$. Its extremities extend over and bear, respectively, on rod $d$ and cross-bar A. When lock-lever I is thrown forward, the tension of the spring J thus applied quickly lifts teeth G by turning rake-head F forward in bearings $g$. Pins $j$ project rearwardly from cross-bar A, and with braces $c$ prevent the load from lifting with the teeth G. Rake-head F may be adjusted nearer the ground by turning standards C forward on bolts $a$ within the limit of slots $k$ in arms B, and there clamped by bolts $b$. The angle of inclination of teeth G is regulated by the longitudinal adjustment of lock-lever I on handle E by slotted bearing $l$. Bolts $b$ pass through slots $k$ in arms B, through the hollow spindles (not shown) on which wheels D turn, and through external washers (not shown) which retain wheels D on said spindles.

The rake is operated by being pushed along on wheels D by handle E. Teeth G being properly adjusted gather the grass as the rake advances. When the teeth are filled, the operator turns lock-lever I forward, when spring J instantly turns rake-head F forward, which raises the teeth G clear of the load. Lock-lever I is then turned back to its place, bringing teeth G in working position again.

I am aware that prior to my invention wheeled lawn-rakes operated from the rear have been made. I therefore do not claim such a combination, broadly; but What I do claim as my invention, and desire to secure by Letters Patent, is—

1. In a wheeled lawn-rake, substantially as described, a pivoted rake-head composed of two parallel rods whose corresponding ends are connected by armatures.

2. In a wheeled lawn-rake, the combination, substantially as described, with a pivoted rake-head composed of two parallel rods whose corresponding ends are connected by armatures, of semicircular teeth coiled around one of said rods and extending beyond and against opposite sides of said other rod.

3. In a wheeled lawn-rake, the combination, substantially as described, with a pivoted rake-head composed of two parallel rods whose corresponding ends are connected by armatures, of semicircular teeth coiled around one of said rods to the extent of the widest distance desired between said teeth.

4. In a wheeled lawn-rake, the combination, substantially as described, with a pivoted rake-head composed of two parallel rods whose corresponding ends are connected by armatures, of semicircular teeth coiled openly around one of said rods, whereby said coils may be screwed into each other one or more turns to decrease the space between said teeth.

5. In a wheeled lawn-rake, the combination, substantially as described, with a pivoted rake-head provided with semicircular teeth, of a spring arranged to turn said rake-head forward to raise said teeth.

6. In a wheeled lawn-rake, the combination, with a rake-frame consisting of cross-bar A, with integral arms B, and standards C, and a rake-head pivoted in standards C, of means of adjusting standards C on arms B to change the vertical position of said rake-head, substantially as described.

7. In a wheeled lawn-rake, the combination, substantially as described, with a rearwardly-projecting handle, a lock-lever thereon, a projecting arm attached to said rake-head, and a wire connecting the extremity of said arm to said lock-lever, of means of adjusting said lock-lever longitudinally on said handle for the purpose of regulating the angle of inclination of said teeth.

ROBERT S. CARR.

Witnesses:
E. E. CARR,
A. C. ROGERS.